US012624817B2

(12) United States Patent
Law

(10) Patent No.: US 12,624,817 B2
(45) Date of Patent: May 12, 2026

(54) METHOD AND APPARATUS FOR A SILHOUETTE DESIGN VEHICLE LIGHT

(71) Applicant: Calvin Law, Chino, CA (US)

(72) Inventor: Calvin Law, Chino, CA (US)

( * ) Notice: Subject to any disclaimer, the term of this patent is extended or adjusted under 35 U.S.C. 154(b) by 0 days.

(21) Appl. No.: 19/014,108

(22) Filed: Jan. 8, 2025

(65) Prior Publication Data

US 2026/0098624 A1 Apr. 9, 2026

Related U.S. Application Data

(60) Provisional application No. 63/703,914, filed on Oct. 5, 2024.

(51) Int. Cl.
| | |
|---|---|
| *F21S 43/50* | (2018.01) |
| *B60Q 1/30* | (2006.01) |
| *F21S 43/20* | (2018.01) |
| *F21W 104/00* | (2018.01) |

(52) U.S. Cl.
CPC ............. *F21S 43/50* (2018.01); *F21S 43/281* (2024.05); *B60Q 1/30* (2013.01); *F21S 2243/00* (2024.05); *F21W 2104/00* (2018.01)

(58) Field of Classification Search
CPC . B60Q 1/30; F21S 43/281; F21S 43/50; F21S 43/2811; F21S 43/28131; F21S 41/47; F21S 41/2805; F21V 19/001; F21V 19/005; F21V 23/003; F21V 23/005; F21V 3/049
See application file for complete search history.

(56) References Cited

U.S. PATENT DOCUMENTS

| | | | | |
|---|---|---|---|---|
| 8,627,586 B2 * | 1/2014 | Bozio | ................. | B60R 13/0256 |
| | | | | 40/580 |
| 2004/0213007 A1 * | 10/2004 | Portillo | ................... | G09F 19/18 |
| | | | | 362/487 |
| 2005/0225999 A1 * | 10/2005 | Bucher | .................... | F21V 7/28 |
| | | | | 362/539 |
| 2019/0337469 A1 * | 11/2019 | Preisler | ............... | B60Q 1/2661 |

FOREIGN PATENT DOCUMENTS

| | | | | | |
|---|---|---|---|---|---|
| CN | 108916816 A | * | 11/2018 | ............. | F21S 43/50 |
| EP | 4390216 A1 | * | 6/2024 | ........... | F21S 43/145 |

OTHER PUBLICATIONS

Innovation Q+ NPL search (Year: 2024).*

* cited by examiner

*Primary Examiner* — Anabel Ton
(74) *Attorney, Agent, or Firm* — Alexander Chen

(57) ABSTRACT

A silhouette art ornamented automobile light lens that comprises a lens body made of polycarbonate or acrylic, an opaque background layer, an ornamental art drawing that is transparent or opaque.

5 Claims, 7 Drawing Sheets

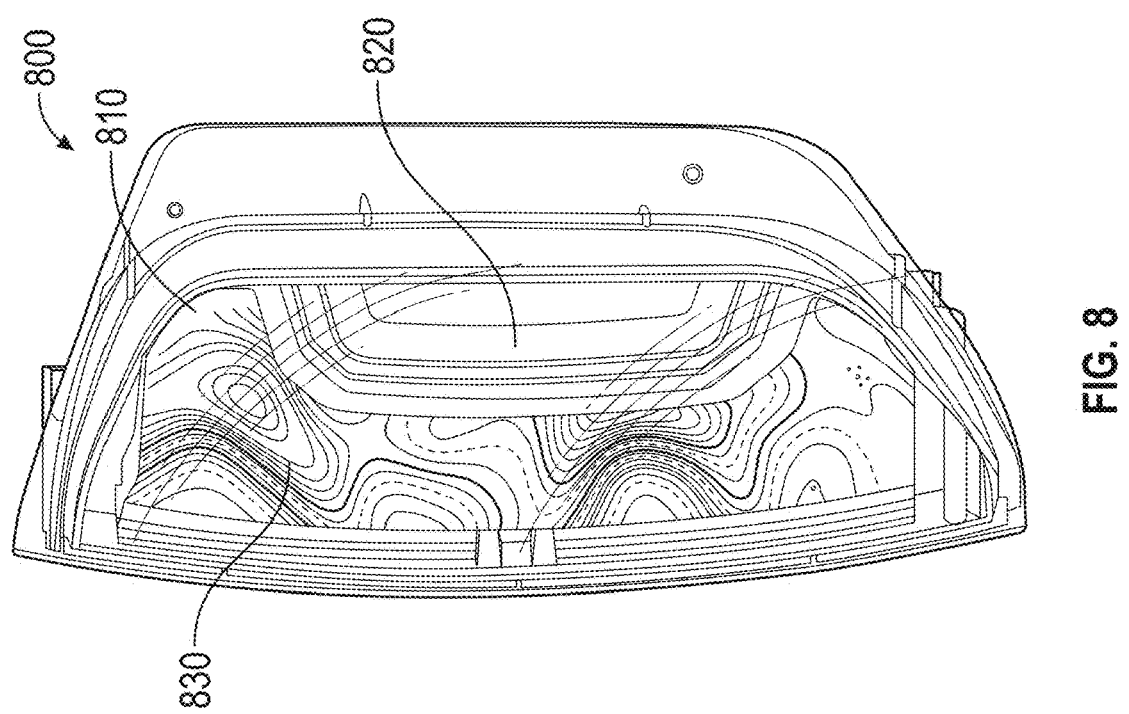
FIG. 8
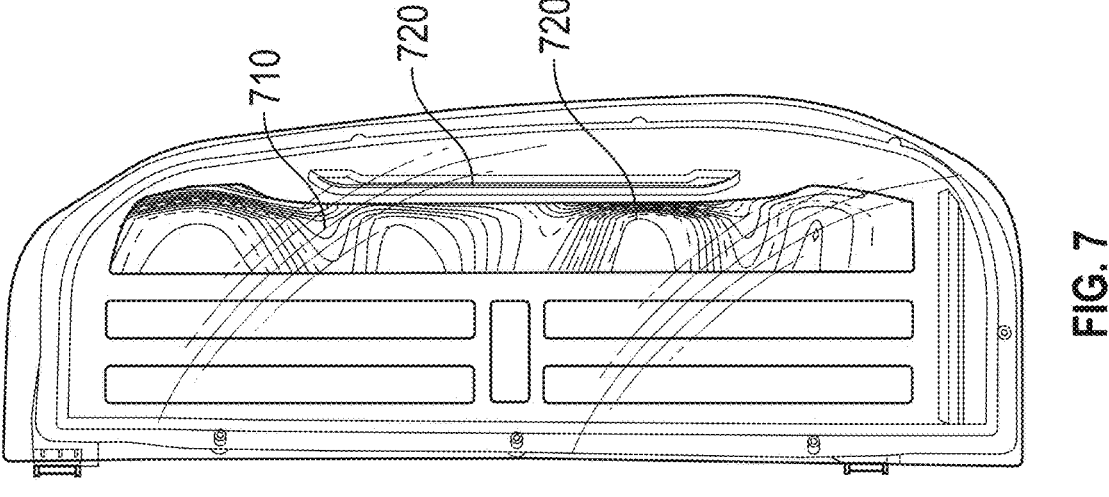
FIG. 7

METHOD AND APPARATUS FOR A SILHOUETTE DESIGN VEHICLE LIGHT

INCORPORATION BY REFERENCE

This application is a non-provisional application of and claims the benefit of earlier filing date under 35 U.S.C. 119(e) to the filing date of U.S. application Ser. No. 63/703, 914, entitled "Method and Apparatus For a Silhouette Design Vehicle Light," filed on Oct. 5, 2024, and which is incorporated herein by reference in its entirety.

FIELD OF INVENTION

The present invention is directed to vehicle light lens and the method that makes such lens. Particularly, the present invention is directed to aftermarket decorative light lens and the method that makes such elaborated and intricate decorative light lens efficiently.

BACKGROUND

The aftermarket, or the secondary market, of automotive parts and equipment, is concerned with the manufacturing, re-manufacturing, distribution, retailing, and installation of all vehicle parts, chemicals, equipment, and accessories, after the sale of the automobile by the original equipment manufacturer (OEM) to the consumers. The purchase of such aftermarket parts is a popular way for automobile enthusiasts to personalize their vehicles.

Decorative vehicle lights have come a long way from simple underglow kits. Today, they're a popular way to personalize and enhance the appearance of vehicles. Advances in technology have led to a wide range of options, from color-changing LED strips to dynamic lighting effects.

In recent years, the efficiency and versatility of Light-Emitting Diodes (LEDs) have revolutionized the automotive lighting industry. They offer a wider range of colors, are more energy-efficient, and have a longer lifespan compared to traditional bulbs. These lights are then controlled by smart lighting systems that employ smart and powerful chips and PCBs that can adjust the lights automatically based on driving conditions, ambient light, and even the driver's mood. Some systems can also be controlled via smartphone apps or voice commands.

The control and commands also developed and sophisticated beyond simple on/off functionality, decorative vehicle lights now offer a variety of dynamic effects, such as pulsing, fading, and strobing. These effects can be synchronized with music or other inputs for a more immersive experience.

Not only powerful and advanced, the decorative vehicle lights can also be easily customized. Thus, options for decorative vehicle lights are virtually limitless. Drivers can choose from a wide range of colors, patterns, and brightness levels to create a unique look for their vehicle.

The most common decorative lights are the underglow kits which are typically consist of LED strips that are installed underneath the vehicle's body. They can create a striking effect when the vehicle is parked or moving. Then, the ambient light kit, installed inside the vehicles, uses soft, diffused light to create a relaxing atmosphere inside the vehicle. It can be installed in various areas, such as the dashboard, doors, and footwells. Then, the exterior accent lights can be added to various parts of the vehicle, such as the grille, headlights, or taillights. They can enhance the vehicle's overall aesthetic. Then, the LED projection lights project patterns or logos onto the ground, adding a unique touch to the vehicle's appearance.

The current invention advances the decorative vehicle light technology further with a vehicle light apparatus having light emitting decorative silhouette arts.

OBJECTIVE OF THE INVENTION

It is an object of this invention to provide a solution for vehicle owners to decorate their vehicles with aftermarket lights.

It is also an object of this invention to disclose a method to make elaborate and intricate designed aftermarket lights.

SUMMARY OF THE INVENTION

This invention is directed to a silhouette art ornamented automobile light lens that comprises a lens body made of polycarbonate or acrylic, a background layer that is opaque or semi-opaque, and an ornamental art drawing that is transparent or opaque.

This invention is further directed to a method of creating a silhouette art ornamented automobile light lens that comprises providing a lens body made of polycarbonate or acrylic, applying a background layer on the lens body that is either opaque or semi-opaque, and applying an ornamental art drawing that is either transparent or opaque. The transparent art drawing is created with a laser engraving machine that removes the opaque background layer. The opaque art drawing is created with a printer.

BRIEF DESCRIPTION

The present invention will be understood and appreciated more fully from the following detailed description taken in conjunction with the drawings in which:

FIG. 7 depicts another embodiment of the present invention where the silhouette art is shown through an opaque protective glass from the front view.

FIG. 8 depicts another embodiment of the present invention where the silhouette art is shown through an opaque protective glass from the side view.

DETAILED DESCRIPTION

The invention will be described in the context of a preferred embodiment.

Figure 1:
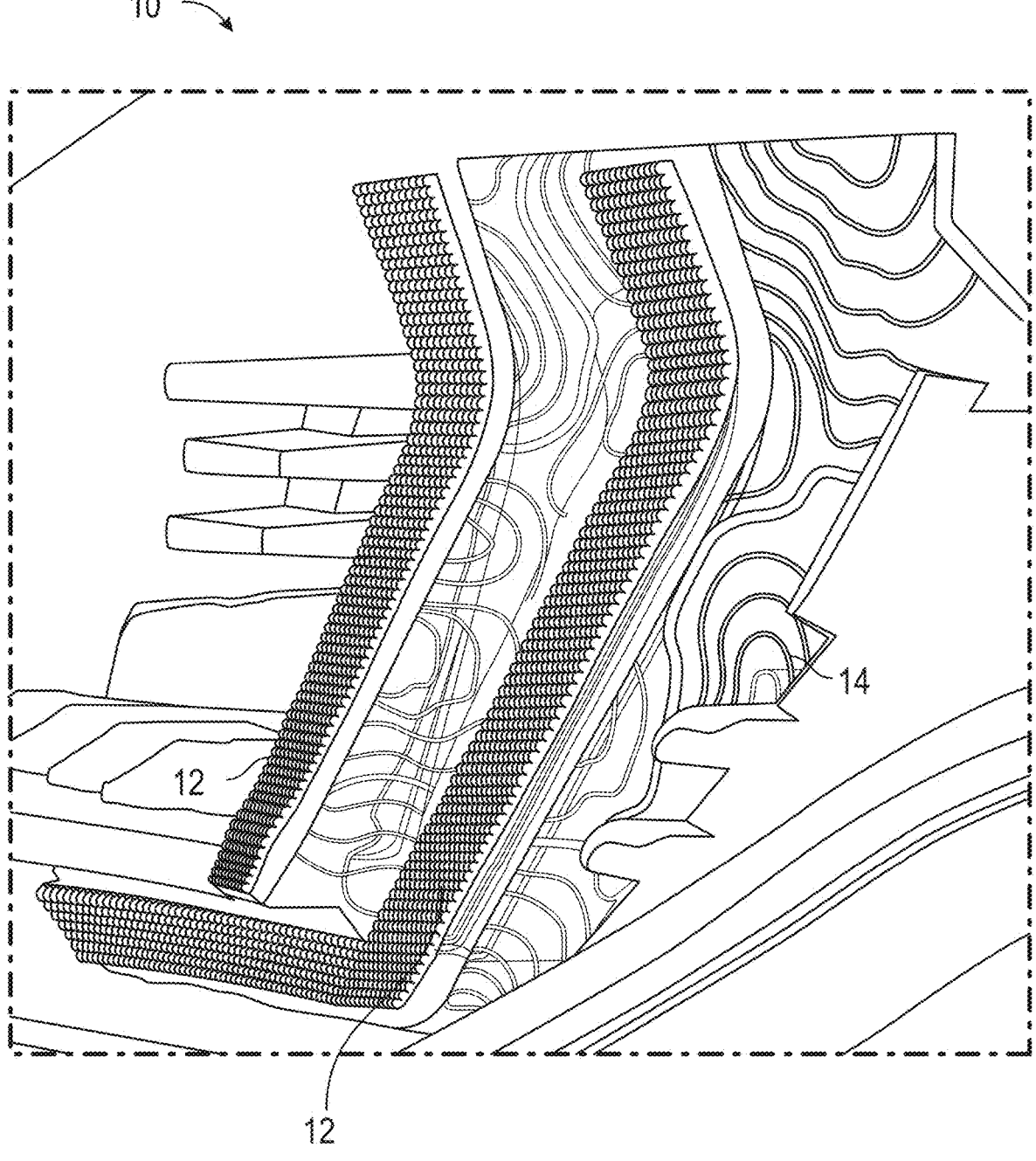
FIG. 1 shows an aftermarket tail light lens with an elaborate and intricate ornamental design.

FIG. 1 shows a very elaborate tail light lens 10 on the current market. The lens 10 has two designed ridges 12 in addition to the multiple elaborate drawings of line patterns 14. The intricate details of the design of this lens raise the difficulty of making the lens in mass production. In addition, this lens is made with an injection molding process that makes customized variations of the art almost impossible to scale in mass production. Furthermore, the lens is translucent and the drawings are also light color, so when the light is on and bright, one cannot distinguish the art from the translucent portion of the lens.

Figure 2:
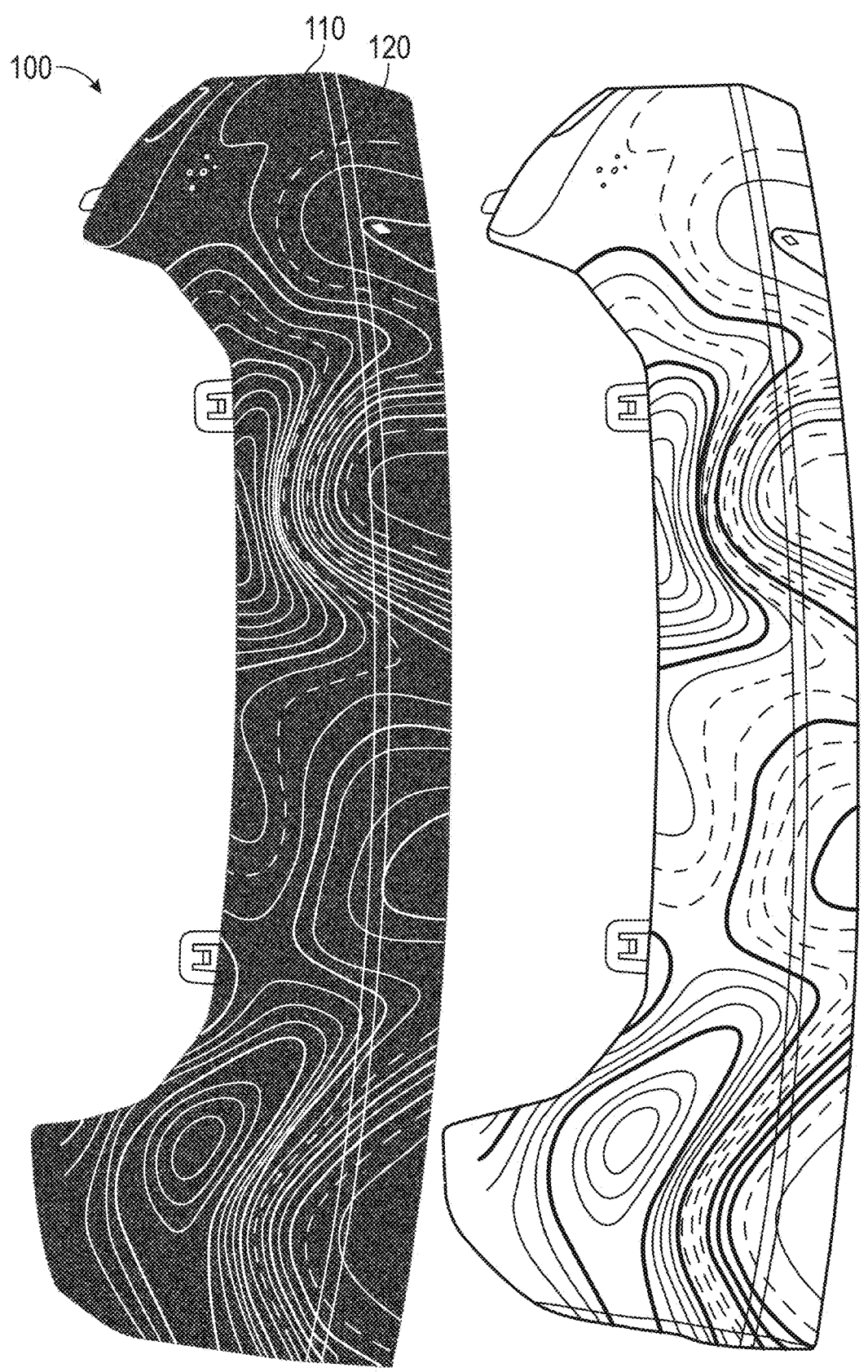
FIG. 2 illustrates an embodiment of the present invention that has an opaque lens and lighter art patterns.

FIG. 2 illustrates an embodiment 100 of the present invention which is a decorative lens of an automobile tail light. This embodiment 100 comprises an opaque lens 110 and the decorative art drawings 120 which are in lighter color or translucent. It is contemplated that another embodiment can have a translucent lens and the decorative art drawings are opaque or in darker color. It is also contemplated that the lens can be made of translucent materials, such as acrylic, polycarbonate, or urethane resin, then engraved with decorative drawings. Alternatively, the lens is painted with an opaque color and, then, engraved with decorative drawings.

Figure 3:
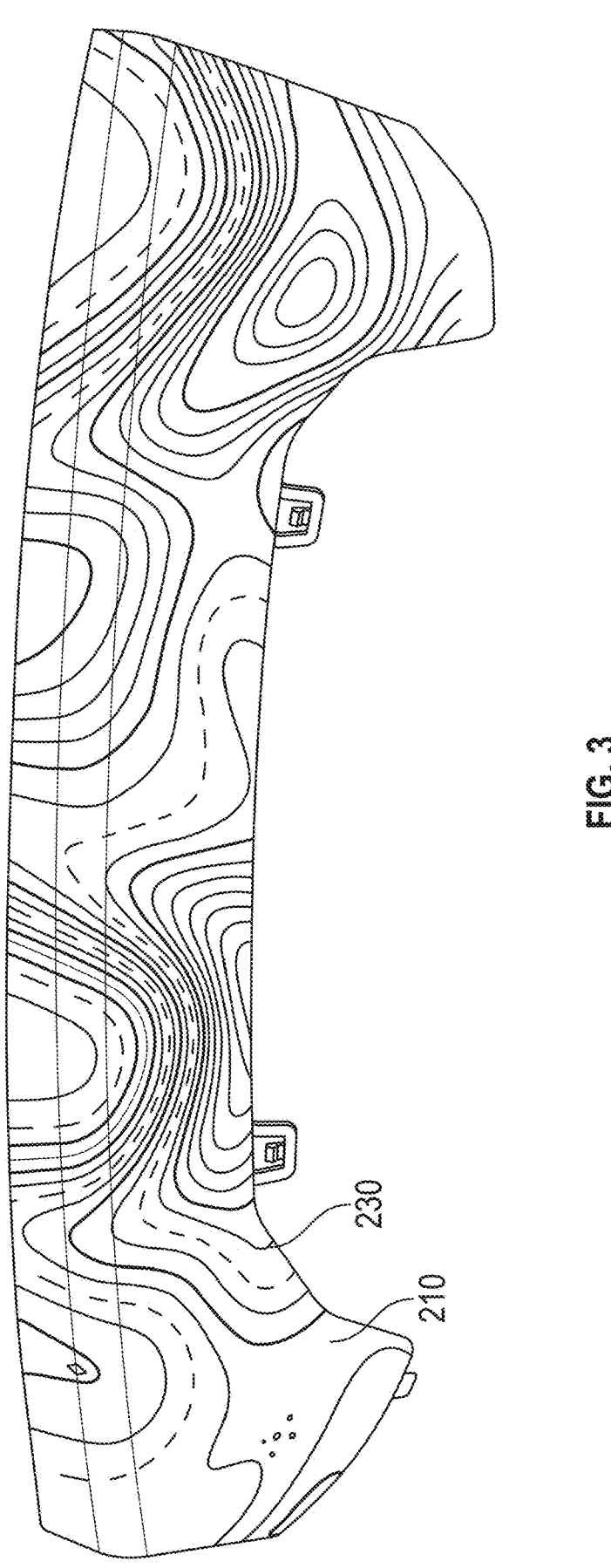
FIG. 3 illustrates an embodiment of the present invention that has a translucent lens and darker art patterns.

FIG. 3 illustrates another embodiment 200 of the present invention where the automobile light lens is made of a translucent material 210 and has darker opaque drawings 220. The decorative drawings 220 are very intricate and elaborate. These intricate and elaborate drawings are a challenge in mass production and the solution to address this challenge will be disclosed hereinafter.

Figure 4:
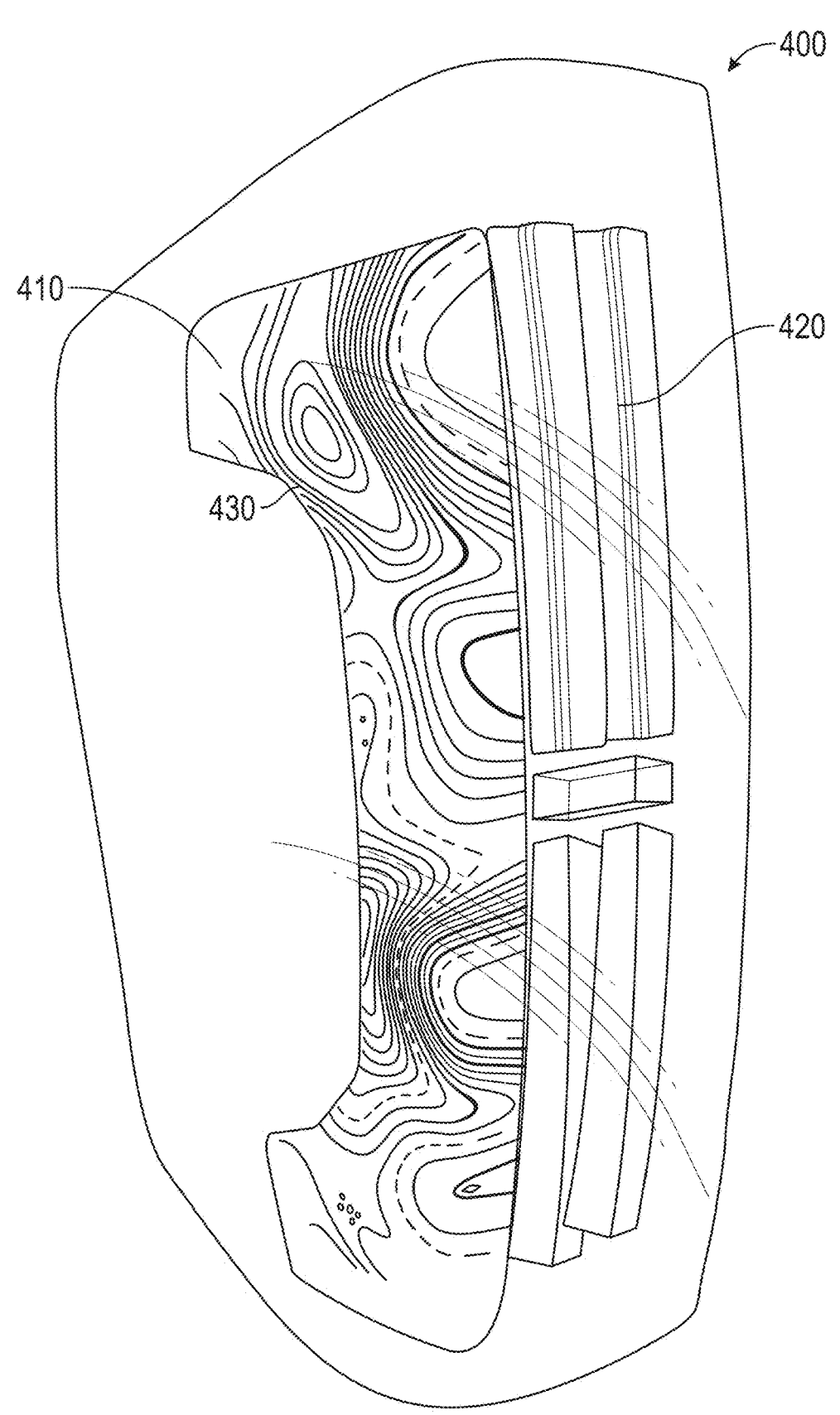
FIG. 4 depicts another embodiment of the present invention where the vehicle light is turned on, and the silhouette art is shown through an opaque protective glass.

FIG. 4 illustrates another embodiment 400 of the present invention where it is installed on a vehicle light. This embodiment comprises an opaque left portion 410 and a translucent right portion 420. When the light is powered on, the light rays beam through the translucent right half 420 without impediment and the grooves 430 of the engraved patterns on the left half 410, and enhance the appearance of the art patterns, contrasting the opaque left portion 410, and showing a silhouette outline of the design. It is appreciated that in another embodiment that has a translucent lens and darker art patterns, the vehicle light will cause the translucent lens to look lighter or white and the dark art patterns will look like ink drawings on a canvas.

It is appreciated that it is a challenge to make the above-disclosed engraved lens in mass production to bring the cost down comparable to the current market value. The above-disclosed embodiments are made with a programmable and smart engraver machine that comprises a laser beam and a printer. The machine further comprises an engraving control module that detects whether the lens is translucent or opaque. If the lens is translucent, the control will deploy the printer to draw the desired art patterns. If the lens is opaque, the control module will deploy the laser beam to engrave the lens with the desired art patterns. With an assembly of these smart engraving machines, the challenge of mass production of the disclosed lens is solved.

Figures 5, 6:
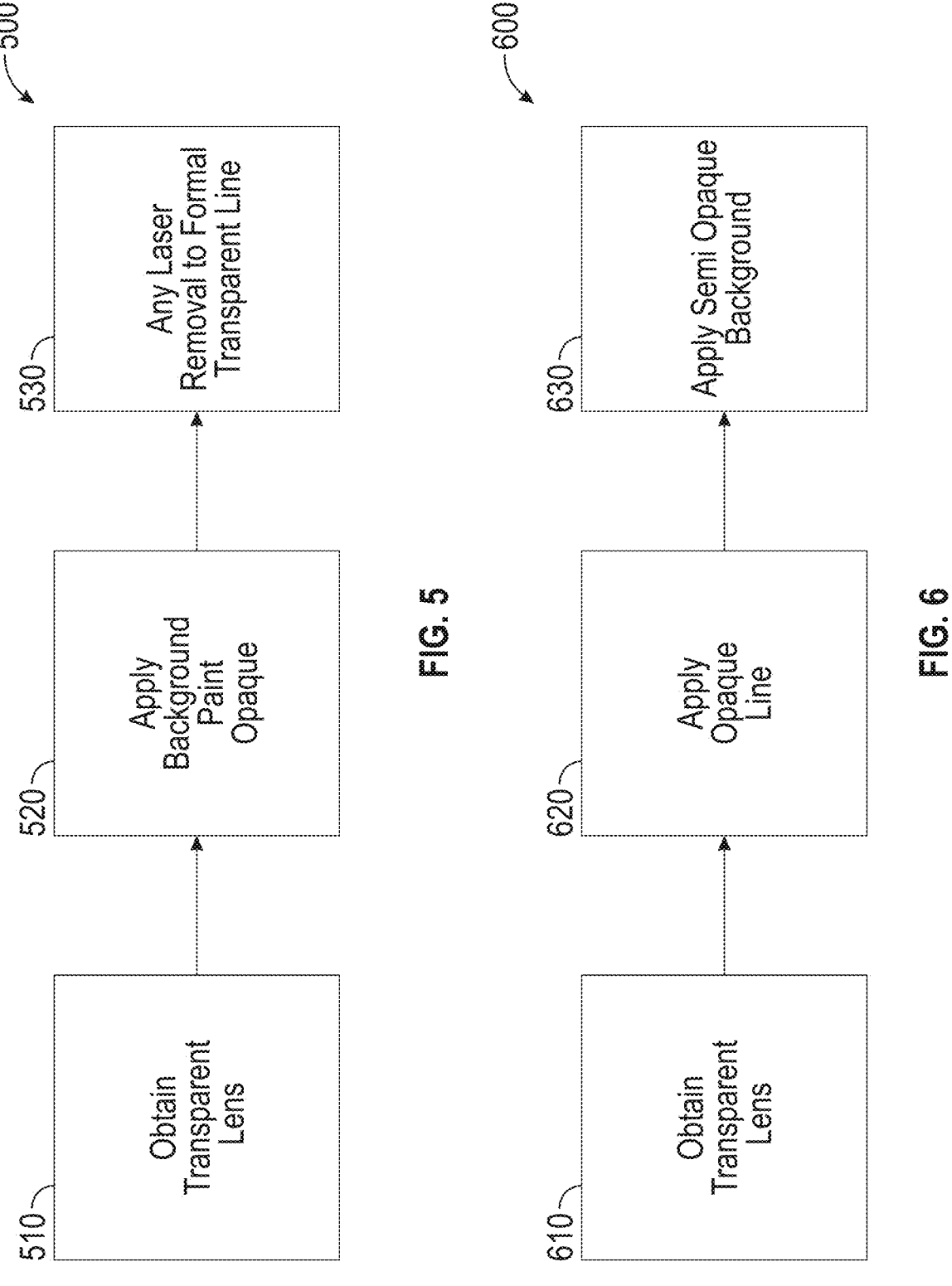
FIG. 5 is a flowchart of a method of the present invention.
FIG. 6 is another flowchart of a method of the present invention.

FIG. 5 discloses an exemplified method 500 of the present invention that makes the above silhouette art lens. First, module 510 receives a transparent lens of a certain vehicle model as the manufacturer desires. Module 520 receives the desired lens model from module 510 and applies an opaque layer. Module 530, in turn, receives the output lens of module 520 and applies laser removal of the opaque layer to create a preset transparent line art drawing.

FIG. 6 discloses another exemplified method 600 of the present invention that makes another embodiment of the present invention. Here, module 610 receives a transparent lens of a certain vehicle model, similar to the method 500 above. However, module 620, after receiving the desired lens model from module 610, applies a preset opaque line art drawing instead. Then, module 630, in turn, receives the output lens of module 620 and applies a semi-opaque layer covering the line art drawing and the lens.

The essence of the present invention's method is to create contrasting line art against the background. Where the background is opaque, the line art is transparent. Where the background is semi-opaque, the line art is opaque. The resulting effect is that the line arts are clearly visible whether the light is on or off. Certainly, when the light is on, the line art or its silhouette is vividly visible.

FIG. 7 depicts another embodiment 700 of the present invention. This embodiment 700 comprises a translucent lens 710 and darker print line art 720. The lens is depicted from a front-view angle.

FIG. 8 depicts another embodiment 800 of the present invention. This embodiment 800 comprises an opaque lens 810, a translucent section 820 of the lens, and an elaborate line art 830. The lens is depicted from a side-view angle.

Figure 9:
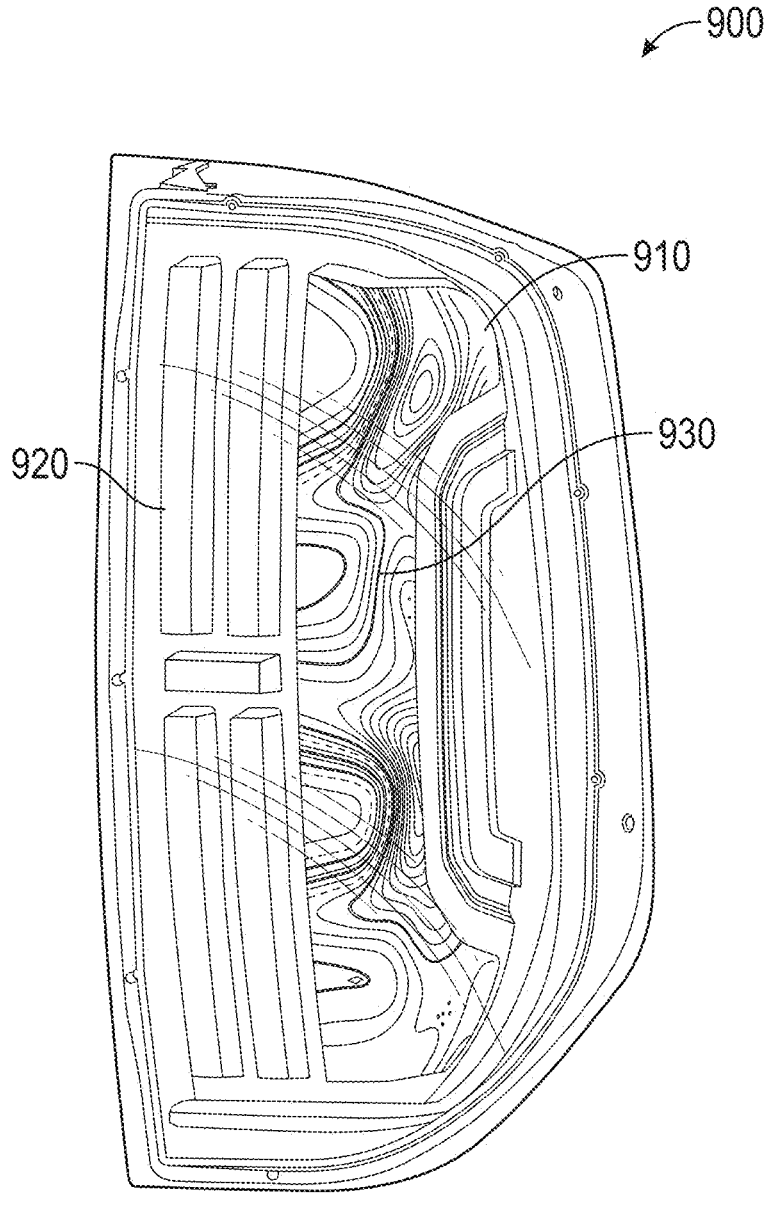
FIG. 9 depicts a perspective view of another embodiment of the present invention.

FIG. 9 depicts another embodiment 900 of the present invention. This embodiment 800 comprises an opaque lens 910, a translucent section 920 of the lens where the vehicle lights emit lights, and an elaborate line art 930. The lens is depicted from a perspective view angle.

What is claimed are:

1. An automobile light lens comprising:
a transparent polymer lens body;
an ornamental art feature on or within the lens body, the ornamental art feature comprising one or both of an opaque ornamental art drawing on the lens body and an ornamental transparent region of the lens body comprising laser-engraved surface relief; and
a semi-opaque layer disposed on the lens body and continuous over the ornamental art feature.

2. The automobile light lens of claim 1, wherein the semi-opaque layer is partially light-transmissive.

3. The automobile light lens of claim 1, wherein said semi-opaque layer is applied after formation of the ornamental art feature.

4. A method of forming an automobile light lens, comprising:
providing a transparent polymer lens body;
forming an ornamental art feature comprising one or both of applying an opaque ornamental art drawing to the lens body and laser-engraving a portion of the lens body to form an ornamental transparent region comprising laser-engraved surface relief; and
applying a semi-opaque layer on the lens body such that the semi-opaque layer is continuous over the ornamental art feature.

5. The automobile light lens of claim 1, wherein the semi-opaque layer has no apertures over the ornamental art feature.

* * * * *